United States Patent [19]
Dixon

[11] 4,173,782
[45] Nov. 6, 1979

[54] RETURN AND LINK MECHANISM

[75] Inventor: Jerry D. Dixon, Boca Raton, Fla.

[73] Assignee: International Business Machines Corporation, Armonk, N.Y.

[21] Appl. No.: 866,425

[22] Filed: Jan. 3, 1978

[51] Int. Cl.² ............................................. G06F 9/18
[52] U.S. Cl. .................................. 364/200; 364/900
[58] Field of Search ... 364/200 MS File, 900 MS File

[56] References Cited

U.S. PATENT DOCUMENTS

| | | | |
|---|---|---|---|
| 3,309,672 | 3/1967 | Brun et al. | 364/200 |
| 3,693,162 | 9/1972 | Spangler | 364/200 |
| 3,972,029 | 7/1976 | Bailey, Jr. | 364/200 |

Primary Examiner—Gareth D. Shaw
Assistant Examiner—C. T. Bartz
Attorney, Agent, or Firm—Edward S. Gershuny

[57] ABSTRACT

In a data processing system, a mechanism for enabling control to be transferred between programs, or portions thereof, that reside at different addresses in an instruction store. The initial linkage is established through the use of a Branch And Link instruction. Subsequent linkages are established through the use of Return And Link instructions, each of which causes the mechanism to transfer control to a previous program, or program segment, while simultaneously establishing the linkage for a subsequent return to this program or program segment.

3 Claims, 1 Drawing Figure

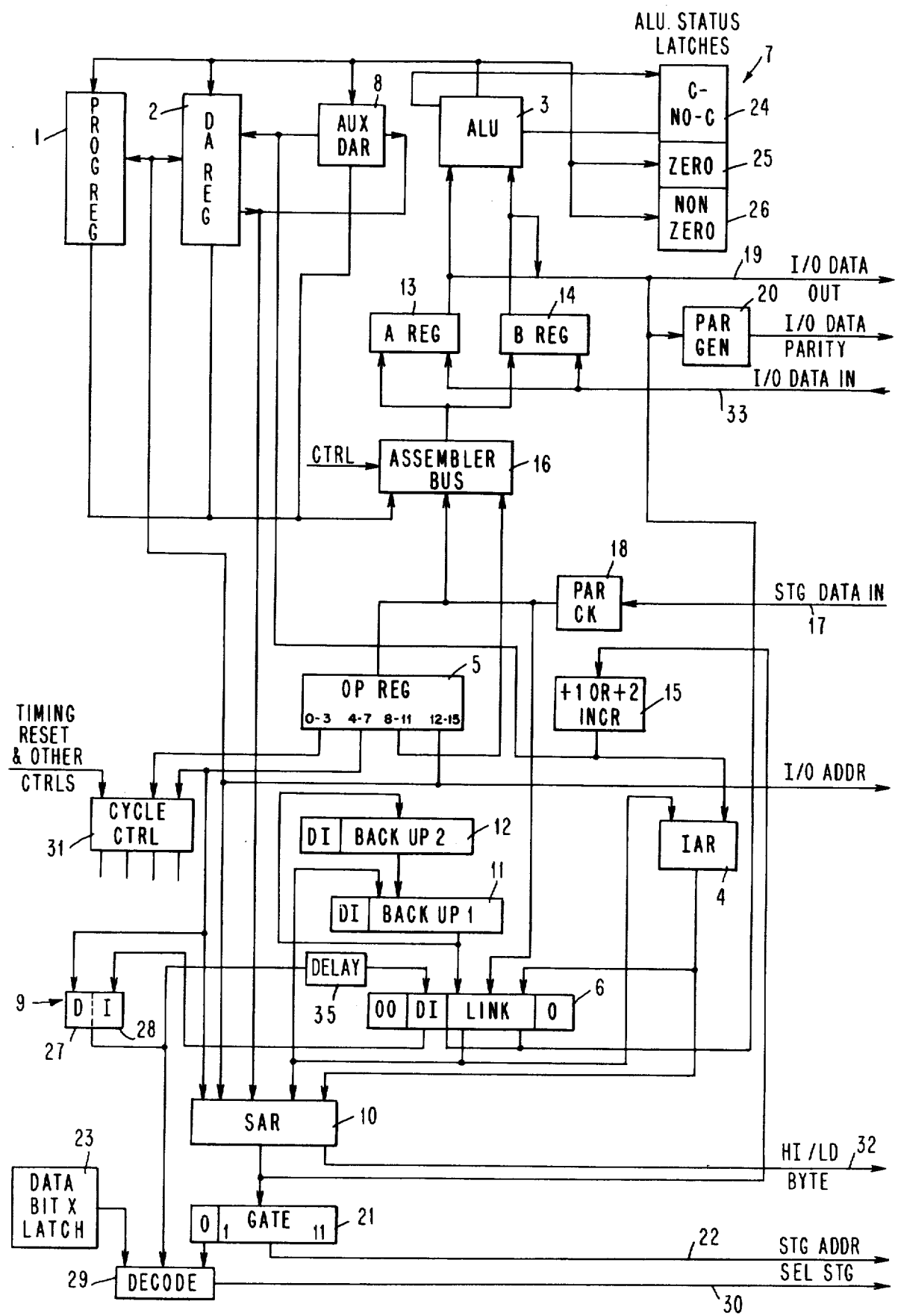

RETURN AND LINK MECHANISM

INTRODUCTION

BACKGROUND OF THE INVENTION

This invention relates to mechanisms for facilitating communication between programs, or program segments, within a data processing system. More particularly, it relates to such a mechanism that is particularly useful in a small microprogrammed controller for facilitating the concurrent execution of two separate control programs.

In a data processing system, particularly that part of a system which is used as a controller for, for example, a plurality of input/output (I/O) devices, it may be necessary for the system to execute separate control programs substantially concurrently even though they may run at asynchronous rates. In order to accomplish this, there must be a mechanism for transferring control between the two programs.

A well known mechanism for accomplishing interaction between programs depends upon a hardware register which preserves, for a limited time, an indication of the memory address of an instruction in a program from which control was transferred. That instruction would typically be a (conditional or unconditional) branch instruction. If there would be a need to return control back to the original program, the contents of this register would have to be saved for subsequent utilization in returning. The saving of the contents of this register used storage (for the save instruction) and time (for the execution of the instruction) while accomplishing no other useful work.

Some of the disadvantages of the system described above were overcome in the 1960's by the provision of a computer instruction called "Branch And Link". This instruction was implemented by hardware which, in response to the instruction, caused a branch to a particular address specified by the instruction, and automatically stored in a "link register" an indication of the address from which control was transferred. Subsequently, the execution of another instruction called "Return" would cause control to be transferred to the instruction at the address indicated by the link register. Thus, a programmer was able very easily to cause the exiting from a main stream of coding to a sub-routine, and then return to the main stream, by using two simple instructions with no need to concern himself with storing the contents of any particular registers.

Although the combination of a Branch And Link and a Return instruction facilitated departure from a main line of programming to a sub-routine and back again, the simple transfer of control and return was uni-directional in the sense that these instructions could be used to go from program A to program B and back again but were of no help whatsoever in then again returning to program B at the point from which its execution was interrupted.

Another prior art approach, which may be combined with the above approaches, is to utilize interrupt mechanisms which respond to various predefined events (such as, for example, the status of an I/O device) by interrupting processing and causing a branch to a predefined address. The address may be (but need not be) related to the particular event that caused the interruption. Interrupt mechanisms, even in combination with the techniques described above, do not provide the ability to readily transfer control back and forth between programs. They do not automatically link back to the point of interruption in a program. An indication of the point of interruption is normally provided by programming. This wastes time. Also, the cost of implementing interrupt mechanisms militates against their use in very small controllers where cost is a significant factor.

SUMMARY OF THE INVENTION

The above and other disadvantages of the prior art are overcome in accordance with a preferred embodiment of this invention by providing apparatus in a data processing system which will decode a particular format of instruction, called "Return And Link", will then cause transfer of control to an instruction at an address specified by a link register, and will alter the contents of the link register to indicate the storage location of the instruction following the Return And Link instruction.

Once the link register has been initialized (for example, by a Branch And Link instruction) control can be very simply transferred back and forth between two concurrently running programs through the use of Return And Link instructions. This mechanism thus enables communication between programs in a very efficient manner in terms of both time and storage. It also greatly facilitates programming because each program can be written with no regard whatsoever for the location, size, speed, etc. of the other program. Each programmer merely scatters Return And Link instructions at interruptible places within his program with no constraints other than some pre-set limits as to how long a particular program may be permitted to maintain control of the system before it transfers control back to the other program.

The above and other features and advantages of this invention will be apparent from the following detailed description of a preferred embodiment of the invention as illustrated in the accompanying drawing which is a block diagram of a microprogrammed control unit embodying this invention.

DETAILED DESCRIPTION

This invention is preferably implemented as part of a small stored program controller which controls a wide range of I/O devices for larger processors. The following description will, for the most part, be limited to those portions of the controller which interact directly with this invention, or which are essential to its operation. Further details of such portions, as well as other portions of a controller are generally well known to those skilled in the art and need no further description here.

GENERAL DATA FLOW

The figure shows the data flow of the exemplary stored program controller. Input data coming into the controller goes to positions PR0 and PR1 of a Program Register Stack 1. The high-order four bits of the data go to PR0, while the low-order four bits go to PR1. Output data leaving the controller goes from PR0 and PR1 of the Program Register Stack. Data from any two registers in the Program Register stack and/or a Data address Register (DAR) Stack 2 may be sent through the Arithmetic and Logical Unit ALU 3 and the result placed in either stack. The ALU can perform the functions ADD, SUB, AND, OR and XOR. In addition, MOVE, COMPARE, TEST, and SHIFT functions may be performed in six different origin-destination modes.

Data from a read only or read-write storage medium (not shown) may be placed in the stacks or (if read-write storage is used) data from the stacks may be written to storage. Instructions as addressed by an Instruction Address Register (IAR) 4 are placed in an Operation Register 5. A Branch target address may come from the immediate data in the instruction, from a DAR or from a Link Register 6.

Status latches 7 are set by instructions using the ALU. These latches may be used in Test and Branch instructions to alter the instruction flow.

DATA FLOW UNITS

The principal units in the data flow of the controller which incorporates this invention are shown in the figure.

A stack 2 of Data Address Registers (DAR) contains sixteen four-bit general purpose registers that each have the capacity to be loaded with the binary representation of a decimal number from zero (0) to fifteen (15). DAR 0, 1 and 2 are also used to address storage and on storage operations contain a twelve-bit storage address. An Auxiliary DAR 8 contains three four-bit registers that have the capacity to be loaded with the binary representation of a decimal number from zero (0) to fifteen (15). Control between the use of DAR 2 or Auxiliary DAR 8 to address storage on storage operations is accomplished by program instructions Select DAR Active or Select Auxiliary DAR Active.

There are sixteen four-bit general purpose registers called Program Registers (PR) 1 that have the capacity to be loaded with the binary representation of a decimal number from zero (0) to fifteen (15). Data from I/O devices is loaded into the first two Program Registers (0 and 1). Data to I/O devices is also taken from PR0 and 1.

The Operation Register 5 is a sixteen-bit register which receives all instructions from storage. Bits 0–7 of an instruction word contain the Operation Code and bits 8–11 and 12–15 contain the addresses and/or mask data.

The Instruction Address Register (IAR) 4 is a twelve-bit register (bits 0–11) which contains the address of the next instruction to be executed. During Initial Program Load (IPL), the IAR contains the byte address of the I/O device data being loaded into consecutive addresses of storage starting at address zero. The low order bit (No. 11) selects the Hi or Low byte of a word. To allow for increased storage capacity, a pair of latches 9 is provided. The twelve-bit Address Registers, IAR 4 and Storage Address Register SAR 10, can address 4096 (4K) bytes, or 2048 (2K) words. The latches 9 comprise a D (Data) and an I (Instruction) latch which handle addressing beyond 2K words to 4K words for Data and Instructions, respectively. When the D (or I) latch is set, the DAR (or IAR) addresses the upper 2K storage words; when the latch is reset, the DAR (or IAR) addresses the lower 2K words. These latches are set and reset by Set Data High (SDH) and Set Data Low (SDL) or Set Instruction High and Set Instruction Low (SIL) instructions, respectively.

There are three registers, the Link register 6 and two Backup Registers 11 and 12 which provide the ability to transfer control from program to program and from program to subprogram. The Link Register has fifteen bits in the preferred embodiment. For reasons unrelated to this invention, the two high order bits are zero. The third and fourth bits indicate the setting of the Data Hi and Instruction Hi Latch status bits 9. The fifth through fifteenth bits are eleven address bits (bits 0–10). (The low order address bit (No. 11) is always zero during Link operations as only full word instruction addressing is used in this embodiment.) The two Backup registers 11 and 12 each have thirteen bits; the Data Hi and Instruction Hi latch bits and eleven address bits (bits 0–10). On a Branch and Link (BAL) instruction, the Link Register 6 is loaded with the contents of the IAR 4 (address after the BAL Instruction) and the D and I latches 9. This will allow a subsequent Return (RTN) Instruction to return the program to the next sequential instruction in the stored program and set the D and I latches as they were prior to the execution of the BAL Instruction. Should a second BAL instruction be executed, before a RTN instruction is executed, the contents of Link Reg 6 will be transferred to the first Backup Register 11 and the new IAR Value and D/I Latch status bits put in Link. Should a third BAL instruction be executed, the contents of the first Backup Register will go to the second Backup Register 12. Link contents will be transferred to Backup Register 11 and the new IAR Value and D/I status put in Link. (The Backup registers in the preferred embodiment cannot be addressed or modified in any way by programming.)

Execution of RTN instructions will cause the reverse sequence as a BAL. Successive RTN instructions before another BAL will cause the program to Branch to the address in the Link Register 6 to continue program execution and also transfer the contents of Backup Reg 11 to Link and Backup Reg 12 to Backup Reg 11.

Execution of a Return And Link (RAL) instruction, the new instruction implemented by this invention, will cause the contents of the Link Reg 6 to be used for the next instruction address (as with a RTN instruction) and will cause the contents of the IAR 6 and the D/I latches 9 to be stored in the Link Reg 6. The transfer of IAR contents and D/I latches to Link Reg is similar to the transfer when executing a BAL, but in the preferred embodiment, execution of the RAL does not affect Backup Regs 11 and 12.

The Storage Address Register (SAR) 10 is a twelve-bit register (Bits 0–11) which contains the address of the instruction or data word being accessed in storage. If extended storage (beyond 2K words) is used, the status of the D latch (on data fetches) or the I latch (on instruction fetches) determines whether the upper or lower half of storage is addressed.

The instruction address is transferred to SAR 10 from the IAR 4 if the next sequential instruction is to be executed or from the OP Register 5 if a branch occurs. On a RTN or RAL instruction, the contents of the Link Register 6 is transferred to the SAR 10. Storage Byte Data addresses are transferred to SAR from the Operation Register or from the DAR stack 2. Three registers of the DAR stack 2 are needed to provide a twelve-bit address.

The A and B Registers 13 and 14 are four-bit registers. They contain the Hi and Lo order bits, respectively, during byte data transfer from the Data Bus In or to the Data Bus Out. The A Reg 13 and B Reg 14 will contain the data to be operated on in the ALU 3 for arithmetic—logical operations. During these operations, the contents of the register indicated by the X-Field or Mask data would be set into the A Reg. The contents of the register indicated by the Y-Field would be set into the B Reg.

A twelve-bit Incrementer 15 will increment the contents of the DAR 2 or the IAR 4 via the SAR 10 by plus one or plus two as required by the operation being performed.

The Assembler Bus 16 is a matrix which gates data from the Program Registers 1, DAR 2, Auxiliary DAR 8, Opeation Register 5 (bits 8–11), and the Storage Data Bus 17 to the A and/or B Registers 13 and 14.

The Arithmetic Logic Unit (ALU) 3 receives data from the A and B Registers and outputs data or results to the Program, DAR or Auxiliary DAR. Data passing through the ALU may be added, subtracted, or logically manipulated. The ALU carry, zero and non-zero latches 7 may be set depending on operation results.

The parity of incoming bits on the Storage Data Bus 7 is checked by parity checker 18. The outgoing data bits on Data Out Bus 19 also have an associated parity bit. The parity bit is generated by parity generator 20 as necessary to provide an odd number of bits in the preferred embodiment.

A gate 21 at the output of SAR 10 allows SAR bits to pass for storage addressing. (When the controller is in Test Mode, gate 21 prevents bits from SAR 10 from passing to the Storage Address Bus 22.)

There are three ALU Status Latches 7 that can be set as the result of an arithmetic, load or input instruction. These latches remain set until reset by another operation (being tested does not change their condition). All latches are reset at the same time even if the instruction being executed does not have the ability to set all latches. The carry latch 24 has two conditions that can be checked, ALU Carry and No Carry. ALU Carry is set on a Carry Out of ALU Bit 0 during an Add type operation. It can also be set during a Shift Right or Shift Right Circular instruction if there is a bit in position three of the register to be shifted. The zero latch 25 is set when zero data is output from the ALU. This latch may be on at the same time as the Carry-No Carry Latch. During Summary, Input and Load Mode operations both zero and non-zero latches may be on. The non-zero latch 26 is set when some value, other than zero is output from the ALU. This latch may be on at the same time as the Carry-No Carry Latch. Status latches are set by passing data through the ALU. When an instruction that passes two nibbles (four-bit words) through the ALU is executed, such as In, SNS or LD, the status latches are not reset for the second nibble. This is defined as "Summary Mode". Summary Mode is also set for some arithmetic instructions to allow multiple operations to be performed and tested with one Conditional Branch instruction.

The D (data) and I (instruction) Latches 9 are used to select Low or Hi Storage Addresses on storage data cycles and instruction fetches, respectively. The D latch 27 and the I latch 28 are set off or set on separately in the programming by using Set Data Low (SDL) of Set Data High (SDH) for the data cycles and Set Instruction Low (SIL) or Set Instruction High (SIH) for the instruction fetch cycles. These latches are also set on or off as a result of executing a RAL or TRN instruction. During the execution of these instructions the D and I latches are reset/set according to the status of the D/I bits in the Link Register. They are set Hi (on) if the status bit is a one and set Lo (off) if the status bit is a zero. These status bits, when set on, cause the controller to select storage locations between the 2048 and 4095 word addresses in Hi Storage. When these status bits are off the controller will address only low storage or the first 2048 or less words. (If only 2K or less words of storage are available these latches must not be used (set) in the programming.) If more than 2K words of storage are available, these latches may be used together or singly. For example, if used singly, data fetches could be made to low storage and instruction fetches to hi-storage or vice-versa.

During the machine cycle in which SDL, SDH, SIL and SIH instructions are decoded and the D and I latches reset/set, storage is being accessed for the next instruction based on the status of the I latch at the beginning of the cycle. Therefore, it will be the second instruction after the SIL or SIH instruction before the accesses to Hi or Low storage will be made according to the new status of the I latch 28. Storage data instructions following an SDL or SDH instruction, however, will access Hi or Low storage in accordance with the new status of the D latch 27 since they are two cycle operations. The Branch and Link Instruction can be used following the SDH, SDL, SIH and SIL instructions to keep track of the storage paging sequence of Data and/or instruction references to Hi or Low storage, and provide branches to sub-routines. RTN instruction will allow returning to the interrupted series of instructions and the previous D and I latch status for storage reference. During IPL the D latch is turned on after 4096 bytes have been loaded to allow IPL up to 8192 bytes of data.

The Data Bit X Latch 23 is used to select storage/word addresses from 4096 to 8191. This latch is set in the programming by the instructions SXN and reset by the instruction SXF. When the Data Bit X latch is set, all accesses to storage will be to addresses between 4096 and 8191 with the status of the D and I latches determining whether the low, 4096 to 6143, or High 6144 to 8191, addresses will be selected. The SXN and SXF instructions can be combined with the SIL and SIH so that Branches can be made from and to any address in storage after the appropriate memory selection has been made.

Addressing by the controller is oriented towards storage modules (ROS or RAM) of 1,024 words, each word having sixteen data bits (two bytes) plus two parity bits. The eight Select Storage lines 30 allow individual selection of storage modules. Bits 1 through 10 on the Storage Address Bus 22 address a module word from 0 through 1023. For a Storage Write Operation, byte selection within the two-byte word is set by the Write Storage High or Low Byte line 32 which is storage address bit eleven from SAR 10.

The data address decode unit 29 accepts three inputs; one from the data bit X latch 23, one from the D/I latches 9 (depending upon whether data or instructions are being addressed) and from the high-order bit from SAR 10 (via gate 21). The decoder 29 will convert the three-bit input to a one of eight output to select one of eight 1K blocks of storage words by raising one of eight Select Storage lines 30.

The cycle control 31 is a microinstruction decoder. It decodes microinstructions that are in OP Reg 5 and, in response to those instructions along with timing signals and various system controls (such as, for example, reset) it produces the gating signals for each cycle of operation. The specific details of construction of the cycle control 31 need not be given here because all details of construction of such devices are well known to those skilled in the art. Also, those skilled in the art will recognize that the device is actually defined defined to a large extent by defining the instruction set of a data processor. For this reason, specific implementations of such cycle control units will vary from system to system.

MICROINSTRUCTION CONTROLS

As stated above, microinstructions are received by the OP Reg 5 from storage via Storage Data In Line 17. In the system of this preferred embodiment, each microinstruction contains sixteen bits. The first four bits define a processing Mode for the system and are always transmitted to the cycle controls 31 for decoding. The preferred embodiment of this invention is part of a system having eleven Modes defined by the first four bits of the microinstruction as follows.

| Bits 1-4 | Mode |
|---|---|
| 0000 | Program Register to Program Register |
| 0001 | Data Address Register to Data Address Register |
| 0010 | Program Register to Data Address Register |
| 0011 | Data Address Register to Program Register |
| 0100 | Mask to Program Register |
| 0101 | Mask to Data Address Register |
| 0110 | Input |
| 0111 | Output |
| 100x | Load |
| 101x | Store |
| 11xx | Branch |

(x means "dont't care")

The meaning of the other fields (bits four through fifteen) of the microinstruction will depend upon the processing Mode. The function performed in each Mode is described below. Also, the instructions within each of the Modes are listed. For the most part, other than this listing, the following instructions will not be further described herein unless they are significant to the preferred implementation of this invention.

The first six modes listed above (PR to PR, DAR to DAR, PR to DAR, DAR to PR, MASK to PR and MASK to DAR) are all used for arithmetic and logic operations which utilize the ALU 3. In these modes, bits four through seven define the operation to be performed by the ALU 3 upon two fields of data transmitted to it. This field is an ALU Instruction and is transmitted from the OP Reg 5 to the cycle control 31 which decodes it to develop control signals for the ALU. Bits eight through eleven define an X-Field address for the PR to PR, DAR to DAR, PR to DAR and DAR to PR Modes, and a Mask for the MASK to PR and MASK to DAR Modes. Bits twelve through fifteen define a Y-Field address for all six of these Modes.

PR to PR Mode (0000): The contents of the Program Register indicated by the X-Field is combined with the contents of the PR indicated by the Y-Field in the manner controlled by the ALU Instruction. The results, if stored, are placed in the PR indicated by the Y-Field. Any of the ALU Status Latches 7 can be set by the arithmetic and shift operations. The Logical instructions can set the zero or non-zero latches. The summary instructions do not reset the latches, but OR results with existing status.

DAR to DAR Mode (0001): In this Mode, the system functions exactly as it does in the PR to PR Mode except that the X-Field and Y-Field refer to Data Address Registers.

PR to DAR Mode (0010): In this Mode, the system functions exactly as it does in the PR to PR Mode except that the Y-Field refere to a Data Address Register.

DAR to PR Mode (0011): In this Mode, the system functions exactly as it does in the PR to PR Mode except that the X-Field refers to a Data Address Register.

Mask to PR Mode (0100): In this Mode, the system functions exactly as it does in the PR to PR Mode except that bits eight through eleven specify a Mask instead of an address.

Mask to DAR Mode (0101): In this Mode, the system functions exactly as it does in the Mask to PR Mode except that the Y-Field refers to a Data Address Register.

The sixteen functions that are performed by the ALU 3 in response to ALU Instructions (bits four through seven in the above six Modes) are

| Function | ALU Instruction (bits 4-7) |
|---|---|
| ADD | 0000 |
| ADD WITH CARRY | 0001 |
| MOVE | 0010 |
| SUBTRACT WITH BORROW | 0011 |
| SUBTRACT | 0100 |
| COMPARE | 0101 |
| SUBTRACT 111 | 0110 |
| COMPARE SUMMARY | 0111 |
| AND | 1000 |
| TEST | 1001 |
| AND SUMMARY | 1010 |
| TEST SUMMARY | 1011 |
| OR | 1100 |
| *SHIFT RIGHT | 1101 |
| EXCLUSIVE OR | 1110 |
| *SHIFT RIGHT CIRCULAR | 1111 |

*These two functions are not performed in either of the Mask Modes.

Input Mode (0110) is used to transfer and/or test the eight bits (one byte) of data on the Data Bus In lines 33. Data is placed on these lines by the selected device whose address is defined in the operand field of the instruction in bits eight through fifteen. The address can be any value between 0 and 255 decimal or FF Hex. There are two Input Mode instructions. They are Input From Device (IN) and Sense Device (SNS). IN causes the system to gate the data on DBI 33 (the data was placed there by the selected device) and store it in PR0 and 1. PR0 contains bits 0-3 and PR1 contains bits 4-7. SNS is the same as IN except the data is not stored in any register, but tested for zero or non-zero status. IN and SNS instructions reset all latches 7 at the beginning of the operation. Only zero and non-zero latches can be set. The second nibble passes through the ALU 3 in Summary Mode and status latches are the OR-ed result of the two nibbles passing through the ALU. The zero and non-zero latches, 25 and 26, may both be on at the end of the operation.

Output Mode (0111) is used to transfer eight bits (one byte) of data via the Data Bus Out Lines 19 to the selected device attachment. As with the Input Mode, the device to receive the data is selected by the appropriate device address in the operand field of the instruction. The device address in the operand field cannot be greater than 255 decimal or FF Hex. There are two Output Mode instructions. They are Output To Device (OUT) and Direct Input And Output (DIO). OUT causes one byte of data from PR0 and PR1 to be sent to the device. PR0 contains bits 0-3 and PR1 contains bits 4-7. DIO is used to transfer the data on the I/O Data Bus In lines 33 to the Data Bus Out lines 19. (The device supplying the data on the DBI lines must have the same address as the device receiving the data on the DBO lines in this system.) The OUT and DIO instructions do not alter the status latches.

Load Mode (1000 except "Load Absolute Address" which is 1001): In the Load Mode, all instructions are two cycles in execution length. During the second or data cycle a full data word is read from storage onto Storage Data Bus In 17. The Lo or Hi byte of the data word is gated for processing depending on the DAR address (bit 11) or the operand address being even or odd, respectively. The byte is gated to the PR, DAR or I/O device. Both bytes of the data word are gated to the Link Register 6 on the two Load Link Reg (LDL) instructions. There are ten different Load instructions.

Load PR (LDR) causes the system to fetch one byte of data from the storage location defined by the three DAR's. The data is placed into two PR's defined by the X-Field and Y-Field. The first half of the data byte is placed into the X-Field register and the second half is placed in the Y-field register. The three DAR's form the twelve-bit byte address by using the contents of DAR 0 for bits 0–3, DAR 1 for bits 4–7, and DAR 2 for bits 8–11. DARs 0, 1 and 2 must be set to the desired storage address before the Load instruction is executed. For the LDR, bits four through seven of the microinstruction are 1001.

Load PR and Increment DAR+1 (LDRP) is the same as LDR but increments the current DAR 0, 1 and 2 plus one. Bits four through seven of this microinstruction are 1011.

Load DAR (LDD) causes the system to fetch one byte of data from the storage location defined by the three DAR's D0, D1 and D2. The data is placed into the two DAR's that are defined by the X-field and Y-Field. The first half of the data byte is placed into the X-Field register and the second half is placed in the Y-Field register. The three DAR's form the twelve-bit address by using the contents of DAR 0 for bits 0–3, DAR 1 for bits 4–7, and DAR 2 for bits 8–11. The DAR must be set to the desired address before the Load instruction is executed. For this microinstruction, bits four through seven are 0100.

Load DAR and Increment DAR+1 (LDDP) is the same as LDD but increments the current DAR 0, 1 and 2 plus one. Bits four through seven are 0110.

Load Memory Indexed (LDI) uses DAR 0 and DAR 1 and the value that is coded in bits twelve through fifteen of the instruction to define the storage address. The twelve-bit address is formed by using the contents of DAR 0 as address bits 0–3, DAR 1 as address bits 4–7 and the value in the instruction as address bits 8–11. The data that is loaded goes into PR's 0 and 1. PR0 contains the first four bits and PR1 contains the next four bits. This instruction will allow the programmer to address up to sixteen storage locations without changing the contents of DAR 0 and 1. Bits four through seven are 1010. Bits eight through eleven may be ignored or may be required to be a particular configuration, for example, 0000.

Memory to I/O Device (MIO) uses the address contained in the DAR's, D0, D1 and D2, to define the storage address for data being sent to an I/O device that is identified by bits eight through fifteen of the instruction. The three DAR's form the twelve-bit address by using the contents of DAR 0 for address bits 0–3, DAR 1 for address bits 4–7 and DAR 2 for address bits 8–11. The desired address must be set in the DAR's before the MIO instruction. The value for the device to be addressed is coded in the operand field and must be between decimal 0 and 255. Bits four through seven are 1100.

Memory to I/O Device and Increment DAR+1 (MIOP) does the same as MIO but increments the current DAR 0, 1 and 2 plus one. Bits four through seven are 1110.

Load Link Register (LDL) will cause the system to load the Link Register 6 from storage at the address defined by DAR 0, 1 and 2. The DARs D0, D1 and D2 must be set up prior to using this instruction and must contain an even address since this operation addresses an entire word in storage. Bits four through seven of the first storage byte and bits zero through six of the second storage byte make up the address loaded into the Link register. Bit two of the first byte contains the control bit for the high or low data storage selection (the D Latch setting) and bit three of the first byte contains the control bit for the high or low instruction storage selection (the I Latch setting). At the same time as the LDL instruction is executed the contents of the first Backup register 11 is transferred into the second Backup Reg 12 and the contents of the Link register 6 is transferred into the first Backup Reg in the same manner as a BAL instruction would do. This instruction can be used to initialize Link Register 6 for the RAL instruction. Bits four through seven are 0000. Bits eight through fifteen may be ignored.

Load Link Register and Increment DAR+2 (LDLP) does the same as LDL but increments the current DAR 0, 1 and 2 plus two. Bits four through seven are 0010.

Load Absolute Address (LDA) uses its bits four through fifteen to define the storage address whose contents (1 byte) is to be transferred to PR0 and 1. PR0 contains bits 0–3 and PR1 contains bits 4–7 of the fetched byte. Bits zero through three of this instruction are 1001.

The Load instructions, except MIO, MIOP, LDL and LDLP reset all ALU Status Latches 7 at the beginning of each operation. Only zero and non-zero latches, 25 and 26, can be set. The second nibble (half byte) passes through the ALU 3 in Summary Mode and the status latches are the OR-ed result of the two nibbles passing through the ALU. The zero and non-zero latches may both be on at the end of the operation. The MIO, MIOP, LDL and LDLP instructions do not alter status latches.

Store Mode (1010 except "Store In Absolute Address" which is 1011): These instructions are essentially the opposite of the Load Mode instructions. In Load Mode, transfers are from storage to registers. In Store Mode, transfers are from registers to storage.

Except for STI and STA, all the Store Mode instructions store one byte of data in storage whose address is defined by the active DAR 0, 1 and 2. These registers form the twelve-bit address by using the contents of DAR 0 for address bits 0–3, DAR 1 for address bits 4–7 and DAR 2 for address bits 8–11. Bit eleven, if on, will cause the store to be in the Hi Byte whereas bit eleven being off will cause the store to be in the Lo Byte half of the word. DAR 0, 1 and 2 must be set to the desired address before the store instruction is executed. A Store Mode instruction will be treated as a NO-OP for read-only storage. The Store Mode instructions do not alter status latches.

The following eight Store Instructions are simply the reverse of their Load Mode counterparts (bits four through fifteen are the same): Store PR (STR), Store PR And Increment DAR+1 (STRP), Store DAR (STD), Store DAR And Increment DAR+1 (STDP), I/O Data To Memory (IOM), I/O Data To Memory And Increment DAR+1 (IOMP), Store Memory Indexed (STI) and Store In Absolute Address (STA).

In Store Mode, there are four instructions relating to the Link register. (In Load Mode there were two.) They are defined below.

Store Link High Order (SLH) causes the system to store the high order bits of the Link register 6 into a storage address defined by the first three DAR's which must be set up prior to the execution of this instruction. It will store the D and I status bits of the Link Register into storage bits two and three and set storage bits zero and one to zero. Storage bits four through seven will receive bits zero through three of the Link Register address field. This instruction must store the Link Register high order bits into an even byte address so they will be available as the higher order part of a full word to the LDL and LDLP instructions.

Store Link High Order and Increment DAR+1 (SLHP) does the same as SLH but increments the DAR's D0, D1 and D2 plus one.

Store Link Low Order (SLL) causes the system to store bits four through ten of the Link Register 6 address field into bits position zero through six of the storage location defined by the contents of DAR 0, 1 and 2. Bit seven of the storage location will be set to zero. The SLL instruction must store the Link Register low order bits into an odd byte address and it must be the byte after the even byte used with the SLH instruction. This will allow the stored contents of the Link Register 6 to be available for reloading by the LDL instructions.

Store Link Low Order And Increment DAR+1 (SLLP) does the same as SLL but increments the DAR's D0, D1 and D2 plus one.

Branch Mode (11xx): The controller which forms the environment of the preferred embodiment of this invention can execute six unconditional branch instructions. Three utilize the Link Register 6. One of them, Return And Link (RAL), is a direct result of implementing this invention. All branch target addresses are full word (two byte) addresses and are defined by bits four through fourteen. The addresses must be even because all instructions start on even byte boundaries. Bit fifteen is part of the mode function for branch instructions. The instruction located at the branch target address will be fetched from storage for execution. The branch target address will be incremented by one and placed in the IAR 4 so that the IAR will contain the address of the next instruction to be executed.

Branch and Wait (BAW) will cause the system to branch and then stop the controller clock after the branch is executed. The controller will start when a Start Clock pulse is received. A system reset will also take the controller out of a Branch and Wait condition. Bits one through three of this micro-instruction are 1100. Bits four through fourteen specify the branch target address. Bit fifteen is 0.

Branch (B) is an unconditional branch to the address defined in bits four through fourteen. Bits zero through three are 1101. Bit fifteen is 1.

Branch and Link (BAL) is an unconditional branch (to the address in bits four through fourteen) which also causes the address of the next sequential instruction (after the BAL) and the status of the D and I latches to be placed in the Link register for future reference by a RTN or RAL instruction. Bits zero through three are 1110. Bit fifteen is 0. In this preferred system, up to three BAL instructions may be given before a RTN instruction is issued without losing the return address. The BAL instruction also causes Link Reg contents to be transferred to the first Backup Reg 11 and Backup Reg 11 contents to be transferred to the second Backup Reg 12. if more than three BAL instructions are issued, only the last three addresses will be saved. Branch Via Link Register (RTN) causes an unconditional branch to the address that is contained in the Link register. Also, the D and I latches are set according to the D and I status bits in the Link Register. Additionally, the contents of the first Backup Reg 11 are transferred to the Link Reg, and the contents of the second Backup Reg 12 are transferred to the first Backup Reg 11. RTN has the format 1111 0000 0000 0001.

Return and Link (RAL) uses the Link Register 6, the D/I latches 9 and the IAR 4. The Link Register must have been loaded prior to the execution of the RAL instruction (by, for example, a BAL, an LDL or an LDLP). At the time of execution, the contents of the Link Register 6 is used for the next instruction address and then the contents of the IAR 4 and the D and I Latches 9 are placed in the Link Register 6. This instruction does not cause changes in the contents of either of the Backup Regs 11 or 12. (BAL and RTN do change those Regs.) In this preferred embodiment, RAL has the format 1111 0010 0000 0001.

Branch Via DAR (BVD) causes a branch to the address formed by the three DAR's. DAR 0 supplies address bits zero through three, DAR 1 supplies address bits four through seven and DAR 2 supplies address bits eight through ten of the target storage address. The low order bit from DAR 2 (bit eleven) is not used for the storage reference. This assures that all branches are to an even byte boundary. The contents of the DAR's are not changed by this instruction. BVD has the format 1111 1000 0000 0001.

There are also ten conditional branch instructions in the environmental system. They are listed below along with the bit configuration for bits zero through three and fifteen. Bits four through fourteen define the branch target address.

| Instruction | bits 0–3 | bit 15 |
|---|---|---|
| BRANCH NO CARRY | 1100 | 1 |
| BRANCH CARRY | 1101 | 0 |
| BRANCH NOT ZERO | 1110 | 1 |
| BRANCH ZERO | 1111 | 0 |
| BRANCH HIGH | 1100 | 1 |
| BRANCH LOW ON EQUAL | 1101 | 0 |
| BRANCH NOT EQUAL | 1110 | 1 |
| BRANCH EQUAL | 1111 | 0 |
| BRANCH TRUE | 1110 | 1 |
| BRANCH FALSE | 1111 | 0 |

The bit configuration of some of these instructions is identical to other instructions. For example, Branch Not Zero, Branch Not Equal and Branch True all have the bit configuration 1110 ... 1 and thus are actually the same instruction. The actual meaning of these instructions will depend upon their use in a program. The first four instructions listed above are used after an arithmetic operation. The next four instructions are used after a compare operation. The last two instructions are used after a test operation. Each of these Branch instructions actually causes one latch to be tested, but the meaning of the setting of the various latches is determined by the previous operation.

In an implementation of this invention on any system, essential elements (and their realization in this preferred embodiment) are a link mechanism for saving addresses (Link Register 6), a mechanism for initializing the link (Cycle Control 31 which controls the system response to BAL, LDL and LDLP instructions) and a mechanism for transferring control to the address saved in the link mechanism and for setting the link to a new value (Cycle Control 31, in response to a RAL instruction, causes the contents of Link Register 6 to be transferred to D/I Latches 9 and IAR 4, and causes the contents of D/I Latches 9 and IAR 4 to be transferred to Link Register 6).

In this preferred embodiment, a delay element 35 (which may be, for example, a pair of latches for intermediate storage) is utilized during the interchange of the contents of LR 6 with the contents of D/I Latches 9 and IAR 4. Before receiving an input that would change the D/I Latches, their contents are transferred to the Delay 35. After the Cycle Controls 31 decode a RAL instruction, the interchange of LR contents with D/I Latch and IAR contents is accomplished as follows. The paths from LR 6 to SAR 10 and from LR 6 to D/I Latches 9 are activated to transfer the LR contents to the SAR and the D/I Latches (as is done for a RTN instruction, except in this case the Backup Regs 11 and 12 are not affected). This sets up the addressing mechanism of the system so that the next instruction to be fetched from storage will be the one at a previously established return point. Then the paths from IAR 4 to LR6 and from Delay 35 (which contains the previous contents of the D/I Latches) to LR 6 are activated to transfer the IAR contents and the old D/I contents to the LR (as is done for a BAL instruction, except in this case the Backup Regs 11 and 12 are not affected). This establishes in the LR 6 the information that will later be used by another RAL (or by a RTN) instruction to return to the instruction following this RAL. Then the path from the SAR 10 through the Incrementer 15 to the IAR 4 is activated, causing the new contents of SAR 10 (which it received from LR 6) to be incremented by +2 (because instruction addressing is on word boundaries) and stored in IAR 4. The IAR 4 thus contains the address of the instruction which follows the instruction at the previously established return point.

The invention provides a mechanism for easily linking between computer programs, thus enabling substantially concurrent operation of two separate programs. This facility is provided without the overhead (e.g., complexity, cost, programming effort, etc.) that would be introduced by an interrupt system. Additionally, this mechanism will link between programs more quickly than the prior art mechanisms discussed above. This latter point is particularly important in an I/O controller, which may need to monitor two devices at the same time and respond very quickly to either of them.

While the invention has been particularly described with reference to a preferred embodiment thereof, those skilled in the art will recognize that various changes in form and details may be made therein without departing from the spirit and scope of the invention.

What is claimed is:

1. For use in a data processing system, apparatus for linking between separate computer programs comprising:
   register means for storing an indication of an address of an instruction; and
   return means, responsive to a particular format of instruction within said programs, said return means cooperating with said register means for causing a branch to the instruction which is at the address indicated by said register means and for causing said register means to store an indication of the address of an instruction which follows the instruction having said particular format.

2. For use in a data processing system, apparatus for linking between separate computer programs comprising:
   register means for storing an indication of an address of an instruction;
   initializing means operatively connected to said register means for causing said register means to store an indication of an initial address; and
   return means, responsive to a particular format of instruction within said programs, said return means cooperating with said register means for causing a branch to the instruction which is at the address indicated by said register means and for causing said register means to store an indication of the address of an instruction which follows the instruction having said particular format.

3. For use in a data processing system which contains an OP Register for holding instructions, an Instruction Address Register for indicating the address of the instruction which follows an instruction held in the OP Register, a Storage Address Register for addressing instructions to be read into the OP Register, and a Link Register for storing instruction addresses; apparatus for facilitating linking between computer programs comprising:
   return means, responsive to a return-and-link instruction having a particular format in said OP Register, to cause the contents of said Link Register to be transmitted to said Storage Address Register and to cause the contents of said Instruction Address Register to be transmitted to said Link Register;
   thereby transferring control to an instruction at the address that was stored in said Link Register and also setting said Link Register so as to enable a subsequent return transfer of control to the instruction following said return-and-link instruction.

* * * * *